(12) United States Patent  (10) Patent No.: US 9,139,149 B2
Lee et al.  (45) Date of Patent: Sep. 22, 2015

(54) EXTERNAL AIRBAG DEPLOYMENT METHOD

(71) Applicant: Hyundai Motor Company, Seoul (KR)

(72) Inventors: Han Sung Lee, Whasung-Si (KR); Yong Sun Kim, Whasung-Si (KR); Jin Ho Bae, Whasung-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/274,473

(22) Filed: May 9, 2014

(65) Prior Publication Data

US 2015/0158446 A1  Jun. 11, 2015

(30) Foreign Application Priority Data

Dec. 11, 2013 (KR) .......................... 10-2013-0154252

(51) Int. Cl.
*B60R 21/013* (2006.01)
(52) U.S. Cl.
CPC .................................... *B60R 21/013* (2013.01)
(58) Field of Classification Search
CPC combination set(s) only.
See application file for complete search history.

(56) References Cited

U.S. PATENT DOCUMENTS

| | | | |
|---|---|---|---|
| 2004/0107033 A1* | 6/2004 | Rao et al. .......................... | 701/45 |
| 2004/0117116 A1* | 6/2004 | Rao et al. ......................... | 701/301 |
| 2008/0309060 A1* | 12/2008 | Hakki et al. ..................... | 280/770 |
| 2009/0218157 A1* | 9/2009 | Rammer .......................... | 180/271 |
| 2009/0326766 A1* | 12/2009 | Wang ................................ | 701/46 |
| 2010/0057305 A1* | 3/2010 | Breed ............................... | 701/47 |
| 2012/0078472 A1 | 3/2012 | Neal et al. | |
| 2013/0124050 A1 | 5/2013 | Jo et al. | |

FOREIGN PATENT DOCUMENTS

| | | |
|---|---|---|
| KR | 10-2012-0013799 A | 2/2012 |
| KR | 10-2012-0063626 A | 6/2012 |
| KR | 10-2013-0008788 A | 1/2013 |
| KR | 10-2013-0053613 A | 5/2013 |

* cited by examiner

*Primary Examiner* — Thomas Tarcza
*Assistant Examiner* — Edward Pipala
(74) *Attorney, Agent, or Firm* — Morgan, Lewis & Bockius LLP

(57) ABSTRACT

In an external airbag deployment method, a detection area located in front of a vehicle is set. A target object is selected from among objects detected in the detection area by comparing relative velocities, overlaps, and Time To External Airbag (TTE) values of the detected objects. It is determined whether the vehicle is stable or unstable by comparing a predicted yaw rate of the vehicle with a measured yaw rate. It is determined whether a relative velocity and an overlap of the target object, predicted at a time when the target object is assumed to collide with the vehicle, are greater than predetermined levels. The external airbag is deployed if it is determined that the vehicle is stable and the predicted relative velocity and overlap of the target object are greater than predetermined levels.

6 Claims, 13 Drawing Sheets

EXTERNAL AIRBAG DEPLOYMENT METHOD

CROSS REFERENCE TO RELATED APPLICATION

The present application claims priority of Korean Patent Application Number 10-2013-0154252 filed on Dec. 11, 2013, the entire contents of which application are incorporated herein for all purposes by this reference.

BACKGROUND OF INVENTION

1. Field of Invention

The present invention relates, in general, to an external airbag deployment method, which is implemented in a vehicle and is configured to predict an effective collision and deploy an external airbag at an exact time based on the results of the prediction, without causing a false operation.

In particular, the present invention relates to an external airbag deployment method, which determines all of the traction stability of a self vehicle, and a physical quantity, a collision probability, and collision avoidance possibility upon predicting a collision with another vehicle even if the deployment of the external airbag has been determined to some degree, and then finally deploys the external airbag, thus remarkably reducing the possibility of malfunctioning that may be a problem in the characteristics of the external airbag, with the result that the reliability of the system can be improved.

2. Description of Related Art

Recently, an external airbag that is outwardly deployed from the front or rear side of a vehicle has been developed and presented as a technology for greatly improving the safety vehicles.

Basically, this technology is configured to deploy an external airbag by previously detecting and predicting a collision situation of a vehicle. However, this technology is problematic in that maximal shock absorption effects must be obtained by deploying the external airbag at an exact time, and in that system stability must be improved by correctly deploying the external airbag at a time point at which it must be deployed, and system reliability must be improved by preventing the airbag from being falsely deployed at a time point at which it must not be deployed.

Conventional technology disclosed in Korean Patent Application Publication No. KR10-2012-0013799 discloses "Method of controlling an airbag module using information before a collision." The method of controlling an airbag module using information before a collision includes the first step of detecting pieces of information about an object located in front of a vehicle using the vehicle's ultrasonic sensor and radar sensor; the second step of comparing information about a distance to the object among the pieces of information about the object detected by the ultrasonic sensor with information about a distance to the object among the pieces of information about the same object detected by the radar sensor; the third step of selecting at least one of the information about the object detected by the ultrasonic sensor and the information about the same object detected by the radar sensor on the basis of the results of the comparison of the distance information, and determining whether the object is located in an area where there is a possibility that the object may collide with the vehicle, based on the selected information; and the fourth step of deploying an airbag module installed inside the vehicle, based on the results of the determination of whether the object is located in the area where there is a possibility that the object may collide with the vehicle.

However, even if the above-described control method is used, a precise control method capable of preventing false deployment and obtaining effective deployment by exactly determining collisions is not presented. Furthermore, even if the measurement performance of a sensor is insufficient, a data management method capable of supporting such measurement performance and then enabling maximally effective determination is not presented.

Finally, there is a further problem in that logic for definitely preventing false deployment by checking the validity of the need for deployment once again is not yet presented.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the prior art and/or other problems. Various aspects of the present invention provide for an external airbag deployment method, which is implemented in a vehicle and is configured to predict an effective collision and deploy an external airbag at an exact time based on the results of the prediction, without causing a false operation.

In various aspects of the present invention, an external airbag deployment method includes a) setting a detection area located in front of a vehicle; b) selecting a target object from among objects detected in the detection area by comparing relative velocities, overlaps, and Time To External Airbag (TTE) values of the detected objects, wherein a TTE is a remaining time until a collision with an airbag cushion occurs when an external airbag is assumed to be deployed; c) determining whether the vehicle is stable or unstable by comparing a predicted yaw rate of the vehicle with a measured yaw rate; d) determining whether the relative velocity and the overlap of the target object, predicted at a time when the target object is assumed to collide with the vehicle, are greater than predetermined levels; and e) deploying the external airbag if it is determined that the vehicle is stable and the predicted relative velocity and overlap of the target object are greater than the predetermined levels.

In one aspect, b) may be configured to select a detected object as the target object if the relative velocity of the detected object is greater than a first reference, the overlap of the detected object is greater than a second reference, and the TTE of the detected object is less than a third reference.

In another aspect, the predetermined levels at d) and e) may be the first reference in case of the relative velocity and the second reference in case of the overlap, respectively. The first reference may be selected from a range between 40 km/h and 50 km/h. The second reference may be selected from a range between 10% and 30%. The third reference may be selected from a range between 70 ms and 90 ms.

In some aspects, d) may include determining whether a collision probability based on a reciprocal of a Time To Collision (TTC) and a variation in collision probability are greater than predetermined levels, wherein the TTC is a remaining time until the target object collides with the vehicle at a time when the target object is assumed to collide with the vehicle, and e) may be configured to deploy the external airbag if the vehicle is stable, the predicted relative velocity and overlap of the target object are greater than the predetermined levels, and the collision probability and the variation in the collision probability are greater than the predetermined levels.

In other aspects, d) may include calculating a required steering avoidance distance and a required braking avoidance distance based on the relative velocity of the target object, and comparing a distance to the target object with the required steering avoidance distance and the required braking avoidance distance, and e) may be configured to deploy the external airbag if the vehicle is stable, the predicted relative velocity and overlap of the target object are greater than the predetermined levels, and the distance to the target object is less than the required steering avoidance distance and the required braking avoidance distance.

In various other aspects of the present invention, an external airbag deployment method of determining the deployment of an external airbag sets a detection area having a predetermined range, selects a target object from among objects detected in the detection area by comparing relative velocities, overlaps, and Time To External Airbag (TTE) values of the detected objects, wherein a TTE is a remaining time until a collision with an airbag cushion occurs when an external airbag is assumed to be deployed, determines whether the vehicle is stable or unstable by comparing a predicted yaw rate of the vehicle with a measured yaw rate, determines whether the relative velocity and the overlap of the target object, predicted at a time when the target object is assumed to collide with the vehicle, are greater than predetermined levels, and deploys the external airbag if it is determined that the vehicle is stable and the predicted relative velocity and overlap of the target object are greater than the predetermined levels.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
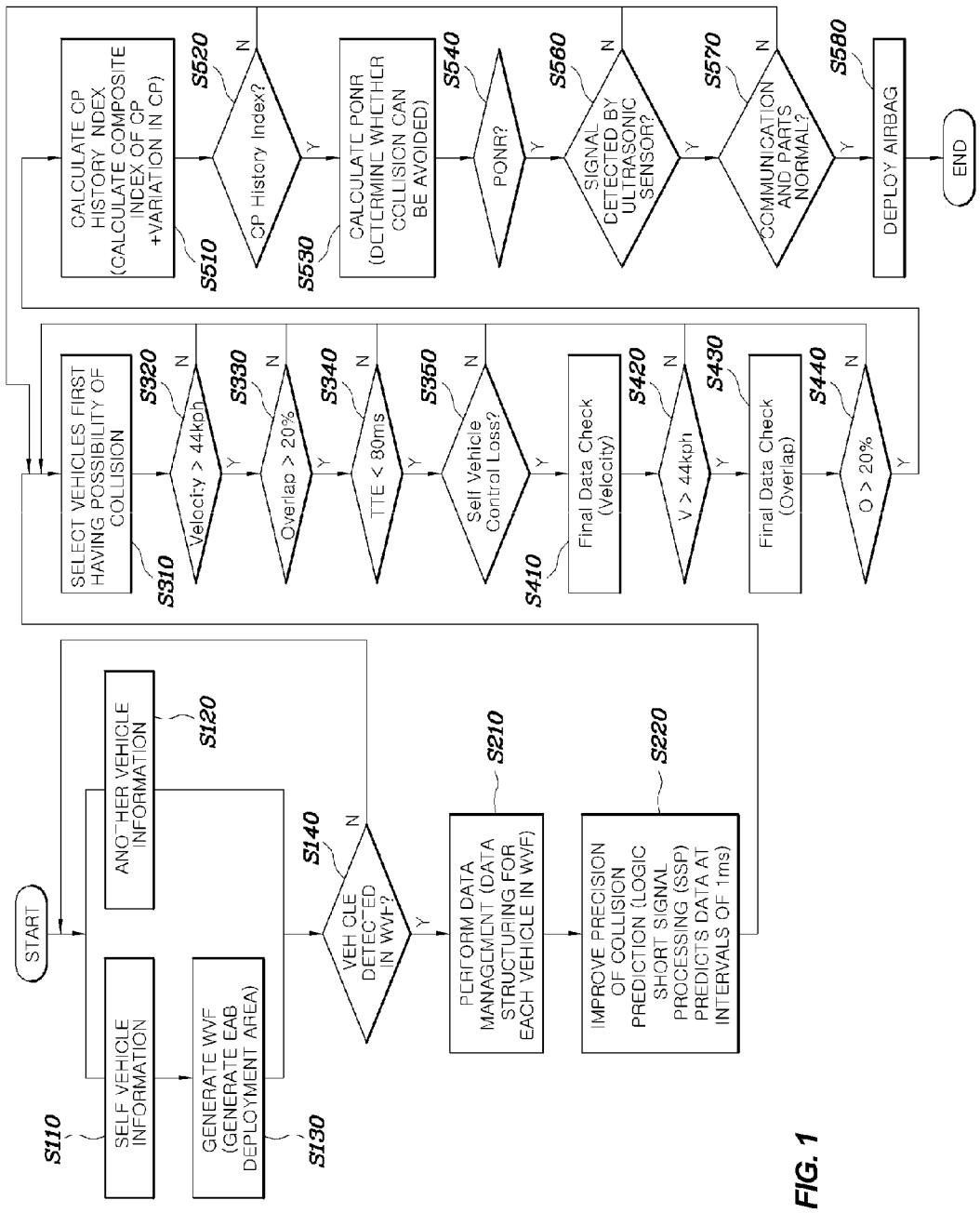
FIG. 1 is a flowchart showing an exemplary external airbag deployment method according to the present invention.

FIG. 1 is a flowchart showing an external airbag deployment method according to various embodiments of the present invention. The external airbag deployment method according to the present invention includes a setting step, a target selection step, a stability determination step, a prediction step, and a deployment step. At the setting step, a detection area located in front of a vehicle is set. At the target selection step, a target object is selected from among objects detected in the detection area by comparing the relative velocities, overlaps, and Time To External Airbag (TTE) values of the detected objects, wherein a TTE is the remaining time until the corresponding object collides with an airbag cushion at a time when the external airbag is assumed to be deployed. At the stability determination step, it is determined whether the vehicle is stable or unstable by comparing the predicted yaw rate of the vehicle with a measured yaw rate. At the prediction step, it is determined whether the relative velocity and overlap of the target object, predicted when the target object is assumed to collide with the vehicle, are greater than predetermined levels. At the deployment step, the external airbag is deployed if it is determined that the vehicle is stable and the predicted relative velocity and overlap of the target object are greater than predetermined levels.

The present invention is significant especially in that, it determines all of the traction stability of a self vehicle, and a physical quantity, a collision probability, and collision avoidance possibility upon predicting a collision with another vehicle even if the deployment of the external airbag has been determined to some degree, and then finally deploys the external airbag, thus remarkably reducing the possibility of malfunctioning that may be a problem in the characteristics of the external airbag, with the result that the reliability of the system can be improved.

Embodiments of the overall deployment process of an external airbag including the external airbag deployment method according to the present invention will be described below.

First, information about a self vehicle is obtained, and information about another object is obtained at steps S110 and S120. In the case of the self vehicle, such information is obtained using sensors for measuring the physical quantity of the self vehicle. In the case of another object, such information is measured using sensors, such as a laser sensor, a radar sensor, and a camera provided in the self vehicle.

In detail, exemplary information about the self vehicle obtained by the sensors is given as follows.

TABLE 1

| Exemplary Sensor | No | Information transferred to ACU |
|---|---|---|
| Vehicle velocity sensor | 1 | FL (Front left) wheel speed |
| | 2 | FR (Front right) wheel speed |
| | 3 | RL (Rear Left) wheel speed |
| | 4 | RR (Rear Right) wheel speed |
| Brake sensor | 5 | M/Cylinder pressure (MPa) |
| | 6 | Wheel slip ratio |
| | 7 | |
| | 8 | |
| Acceleration sensor | 9 | Longitudinal acceleration |
| | 10 | Lateral acceleration |
| Yaw rate sensor | 11 | Yaw rate (rad/sec) |
| | 12 | |
| Wheel angle sensor | 13 | Steering wheel angle |
| | 14 | |

Meanwhile, exemplary information about another object, obtained by the sensors, is given as follows.

TABLE 2

| Exemplary Sensor | No | Information transferred to ACU |
|---|---|---|
| Radar (40 ms) | 1 | Relative velocity |
| | 2 | Relative distance |
| | 3 | Longitudinal position |
| | 4 | Lateral position |
| | 5 | Tracking ID |
| | 6 | TTC (time to collision) |
| Camera (80 ms) | 7 | Classification information |
| | 8 | Object width |
| | 9 | Longitudinal position |
| | 10 | Lateral position |
| | 11 | |
| | 12 | |
| | 13 | |
| | 14 | |
| Ultrasonic (10 ms) | 15 | Relative distance |
| | 16 | |

TABLE 3

| No | Information transferred to ACU |
|---|---|
| 1 | Object ID |
| 2 | Position X |
| 3 | Position Y |
| 4 | Velocity X |
| 5 | Velocity Y |
| 6 | Object age |
| 7 | Object prediction age |
| 8 | Object time offset |
| 9 | Object classification |

By means of the information obtained by the sensors, the self vehicle can obtain relative information and absolute information about the self vehicle and another object. All of the relative and absolute information is used in the following procedure.

Figure 2:
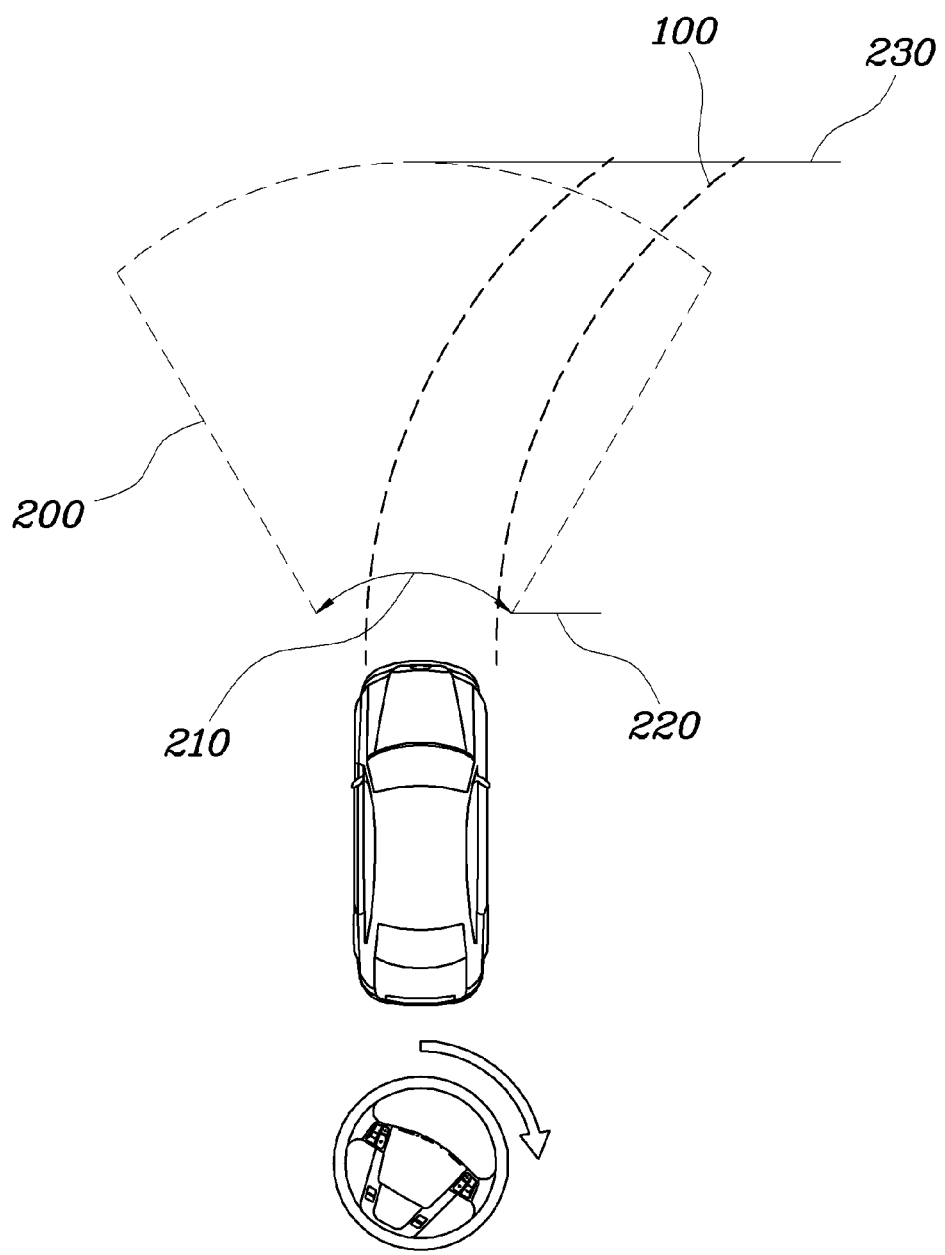
FIG. 2 is a diagram showing an exemplary detection area of the external airbag deployment method according to the present invention.
Figure 3:
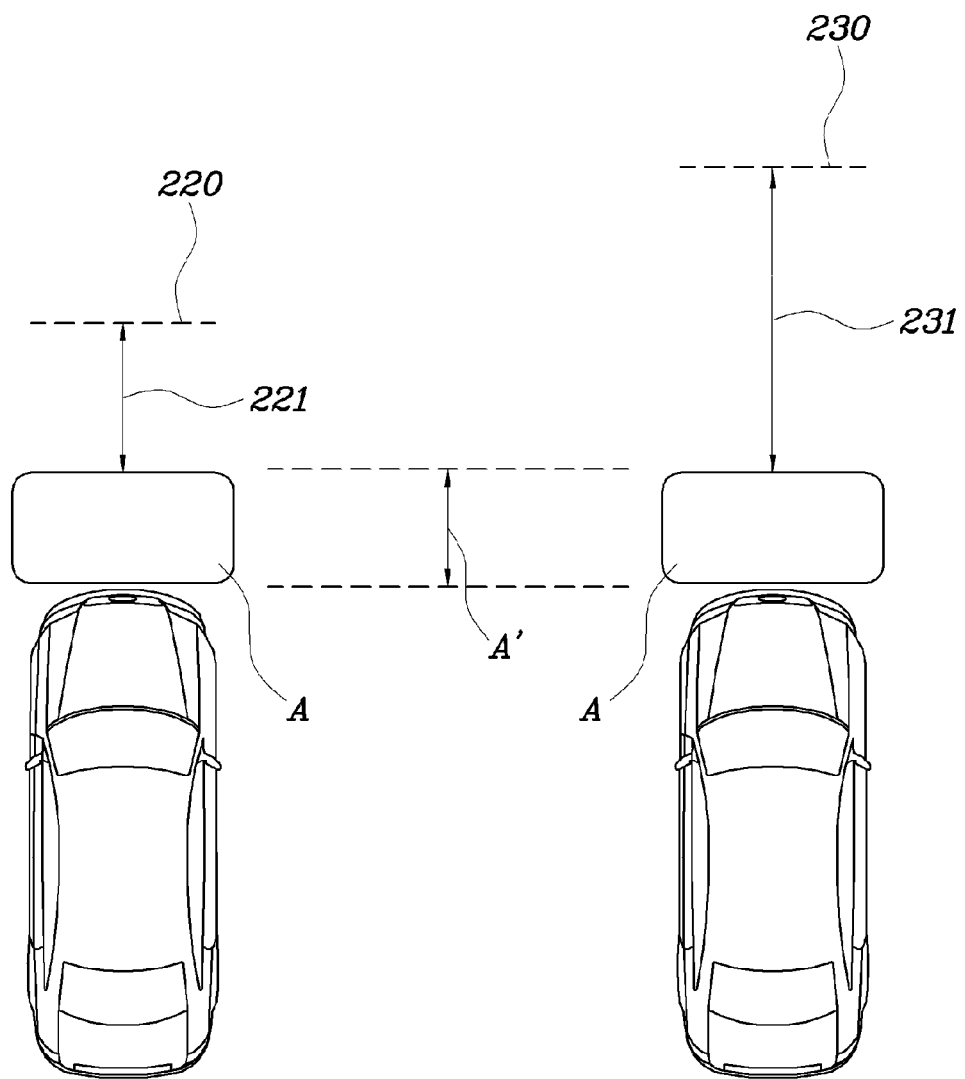
FIG. 3 is a diagram showing an exemplary detection area of the external airbag deployment method according to the present invention.

Further, the setting step S130 of setting the detection area located in front of the vehicle (also referred to as a Wide Vehicle Funnel: WVF) is performed. As shown in FIG. 2, the setting step is configured to set a basic area 100 which is moved while being curved to the left and right to correspond with the steering movement of the vehicle, and a real area 200 in which the time of the external airbag of the vehicle and the velocity of the vehicle are taken into consideration.

In this case, the basic area is obtained by calculating a radius of rotation of the vehicle using a vehicle width and a steering angle and by offsetting the radius of rotation to opposite sides of the vehicle. Such a radius of rotation of the vehicle can be derived by the following Equation (1):

$$\rho = \frac{W}{2} \cdot \frac{W_{RL} - W_{RR}}{W_{RL} + W_{RR}}, \text{ (calculation of radius of rotation)} \quad (1)$$

where W denotes the wheel base of the vehicle, and $W_{RX}$ denotes the wheel speed of the vehicle.

Further, the fan-shaped real area can be set in consideration of the relative velocity of the vehicle and the deployment time of the external airbag.

That is, when the time required to fully deploy the external airbag is assumed to be e.g., 65 ms, the limit of a minimum real area is obtained in consideration of the time during which the cushion of the airbag is fully deployed at the minimum relative velocity. If it is desired that the vehicle is protected by deploying the external airbag of the present invention in a collision occurring at a relative velocity of a minimum of e.g., 44 km/h, a separation distance is calculated at a relative velocity based on a time of e.g., 65 ms that is a minimum time required to deploy the external airbag, and the thickness of the airbag is added to the separation distance, so that the limit of the real area that must be considered to be a minimum can be obtained.

That is, the minimum value of the real area in that case can be calculated as e.g., 1.5 m that is obtained by adding e.g., 0.7 m (the thickness of the airbag) to e.g., 0.8 m (a distance based on a relative velocity of e.g., 44 km/h and a time of e.g., 65 ms), that is, 0.7 m+0.8 m.

Further, the maximum value of the real area can be calculated as a value that is obtained by adding e.g., 0.7 m (the thickness of the airbag) to e.g., 2.9 m (a distance based on a maximum relative velocity of e.g., 160 km/h and a time of e.g., 65 ms), that is, 0.7 m+2.9 m, when it is desired that the external airbag is deployed in a collision having a maximum relative velocity of e.g., 160 km/h.

One would appreciate that all the numbers, values, data points, etc., disclosed herein are exemplary and/or are presented for the purpose of illustration and description. These numbers, values, data points, etc., are readily adjustable.

However, this case indicates that a vehicle velocity is very high, wherein such a deployment operation is possible only when a minimum recognition time required by a sensor, such as a camera, to identify an object, a time required by the sensor to sample measured values, and a time corresponding to the number of sampling times are additionally secured. Therefore, in the case of the maximum value, e.g., 8.9 m, that is a distance based on a camera determination time of e.g., 200 ms and a relative velocity of e.g., 160 km/h and e.g., 8.9 m that is a distance based on a time of e.g., 200 ms during which sampling at a sampling time of e.g., 40 ms is performed five times and a relative velocity of e.g., 160 km/h, are additionally required, and as a result, a maximum value of e.g., 21.4 m is required.

Therefore, in the case of an embodiment, another object can be searched for in an area spaced apart from the front of the vehicle by at least e.g., 1.5 m, and then the airbag can be deployed. Further, another object can be searched for in an area spaced apart from the front of the vehicle by a maximum of e.g., 21.4 m, and then the airbag can be deployed.

In this way, other objects are detected in a range in which the basic area and the real area overlap each other. However, if other objects are present both in the basic area and in the detection area, an object having a higher dangerous level can be set as a target object. Alternatively, in a case where it is assumed that only 10 objects can be covered and tracked in the real area, if 12 objects are detected, a criterion for elimination can be utilized in such a way as to eliminate other objects detected in a section in which the basic area and the real area do not overlap each other.

Meanwhile, if any object is detected in such a detection area, such an object is called a detected object at step S140. The physical quantities of detected objects can be measured by a laser sensor or a radar sensor, and the type of the detected objects can be determined by a camera sensor. Further, identifications (IDs) can be assigned to the respective detected objects, and the relative physical quantities of the detected objects based on the IDs are sensed and continuously updated.

That is, the setting step further includes the step S210 of recognizing detected objects in the detection area and assigning IDs to the detected objects, and the step S220 of updating detected objects whenever measurement is performed by a front sensor.

Figure 4:
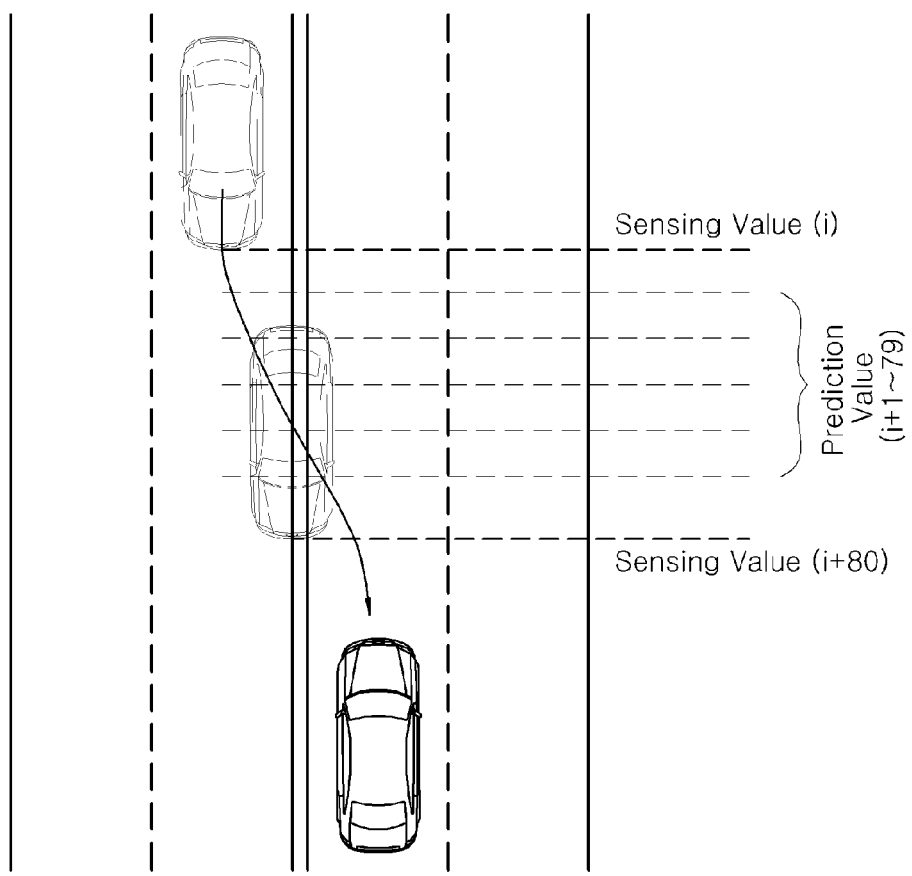
FIG. 4 is a diagram showing an exemplary prediction procedure of the external airbag deployment method according to the present invention.

Meanwhile, the measurement periods of the respective sensors differ from one another, but it is not easy to obtain a sufficient measurement period required by the present invention. That is, FIG. 4 is a diagram showing the prediction procedure of the external airbag deployment method according to various embodiments of the present invention. In this case, the target selection step and the prediction step can be configured such that data about detected objects and a target object is updated at intervals of the measurement period of the front sensor, and predicted data is calculated at intervals of a predetermined time during each measurement period and can be used as data about the detected objects and the target object.

That is, if the measurement period of the sensor is e.g., 80 ms, data is not provided during the measurement period of e.g., 80 ms. Therefore, in this case, it is apparent that measured values are basically updated at intervals of e.g., 80 ms that is the measurement period, but updated values must be able to be predicted at intervals of e.g., 1 ms even during the measurement period.

For this operation, as shown in the drawing, if it is assumed that the measurement by the sensor is performed at time i, a value at time i+1 is obtained using the value obtained at time i. This can be obtained using a tracking filter, such as an alpha-beta filter or a Kalman filter. Thereafter, at times ranging from i+1 to i+79, updating is performed using individual values. This procedure can be understood by the following Equation (2):

$$\hat{x}_{i+2} = \hat{x}_{i+1} + \Delta T \hat{v}_{i+1}$$

$$\hat{v}_{i+2} = \hat{v}_{i+1} + \Delta T a_s, TTE = (\hat{x}_{i+2} - 0.7)/\hat{v}_{i+2}$$

$$(\Delta T = 1 \text{ ms}, a_s: \text{Self Vehicle Acceleration}) \quad (2)$$

As described above, a subsequent position is obtained using a previous position and a previous velocity, and a subsequent velocity is continuously estimated using current acceleration, that is, acceleration at a time point at which the sensor performs measurement. Since this measurement is performed for a very short time, the range of errors is not very wide even if a subsequent velocity is accumulatively calculated using the current acceleration. Further, time TTE can be obtained by subtracting e.g., 0.7 m that is the thickness of the airbag from a relative distance and by dividing the subtracted result value by a velocity, at intervals of a predetermined time, e.g., 1 ms.

Meanwhile, the present invention performs the danger selection step S310 of selecting an object having the shortest Time To EAB (TTE), from among the detected objects in the detection area, as a dangerous object, wherein the TTE is the remaining time until the airbag cushion collides with the object at a time when the external airbag is assumed to be deployed. Alternatively, the danger selection step can be configured to select an object having the shortest Time To Collision (TTC), from among the detected objects in the detection area, as a dangerous object, wherein the TTC is the remaining time until the object collides with the vehicle at a time when the collision with the vehicle is assumed to occur.

That is, from among the objects detected in the detection area, an object having the shortest TTE or TTC is first selected as a dangerous object.

Figure 6:
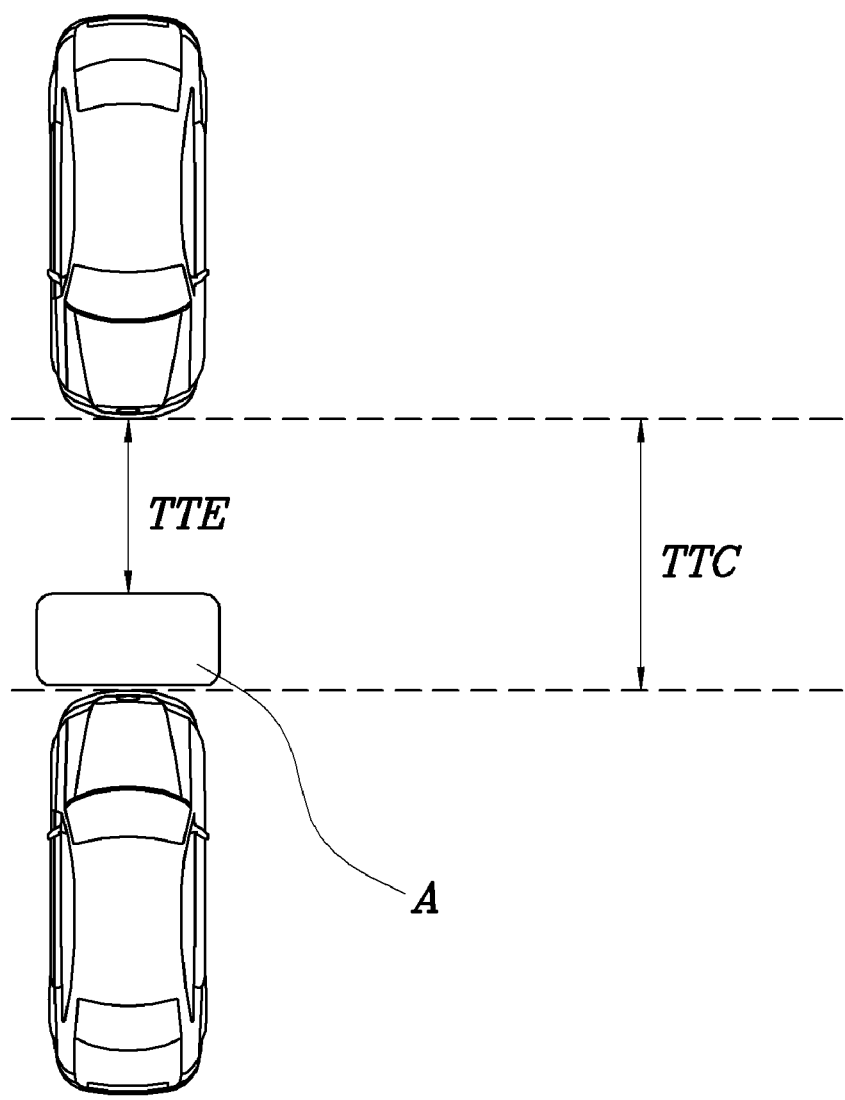
FIG. 6 is a diagram showing exemplary TTC and TTE of the external airbag deployment method according to the present invention.
Figure 7:
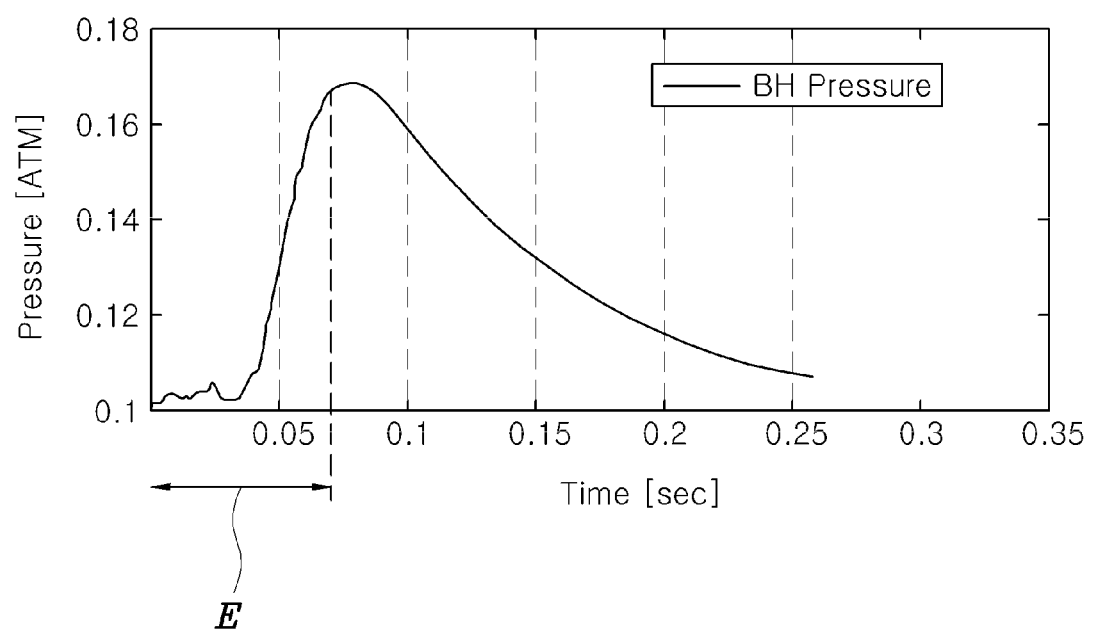
FIG. 7 is a diagram showing exemplary TTC and TTE of the external airbag deployment method according to the present invention.

FIGS. 6 and 7 are diagrams showing TTC and TTE of the external airbag deployment method according to various embodiments of the present invention. In this case, a TTE denotes the remaining time until an object collides with an airbag cushion at a time when the external airbag is assumed to be deployed, and a TTC denotes the remaining time until the object collides with the vehicle at a time when the collision with the vehicle is assumed to occur.

That is, as shown in FIG. 6, if the airbag is assumed to be deployed, a TTE denotes a time during which an object collides with the airbag immediately at a time when the airbag is fully deployed. In this case, as shown in FIG. 7, as time elapses during the deployment of the airbag, the pressure of the cushion is increased, is maximized when the airbag is fully deployed, and is then decreased from that time. In order to cause the object to collide with the airbag when the airbag is fully deployed, a time TTE is introduced. Therefore, in the case of the external airbag, the TTE is obtained from the distance of the current object, and the maximum shock absorption performance can be obtained if the airbag is caused to be deployed for the obtained time TTE.

Meanwhile, a TTC denotes the remaining time until an object collides with the bumper of a vehicle, and is a concept frequently utilized in a conventional internal airbag mounted in the vehicle.

Therefore, in a self vehicle, an object having the shortest TTC, which is the remaining time until the object collides with the vehicle at a time when a collision with the vehicle is assumed to occur, can be selected from among a plurality of objects detected in the detection area as a dangerous object. Alternatively, an object having the shortest TTE or TTC can be first selected from among the objects detected in the detection area as a dangerous object.

Furthermore, as will be described below, it is determined whether to deploy the airbag while the dangerous object is being intensively monitored. That is, when the relative velocity of the dangerous object is greater than a first reference at step S320, an overlap is greater than a second reference at step S330, and a TTE is less than a third reference at step S340, the target selection step of selecting the dangerous object as a target object is performed.

First, the relative velocity of the dangerous object is monitored. Further, the relative velocity is preferably greater than a minimum of e.g., 44 km/h as the first reference. The reason for this is that the minimum relative velocity, at which the vehicle must be protected in a collision with the dangerous object, is e.g., 44 km/h.

Figure 5:
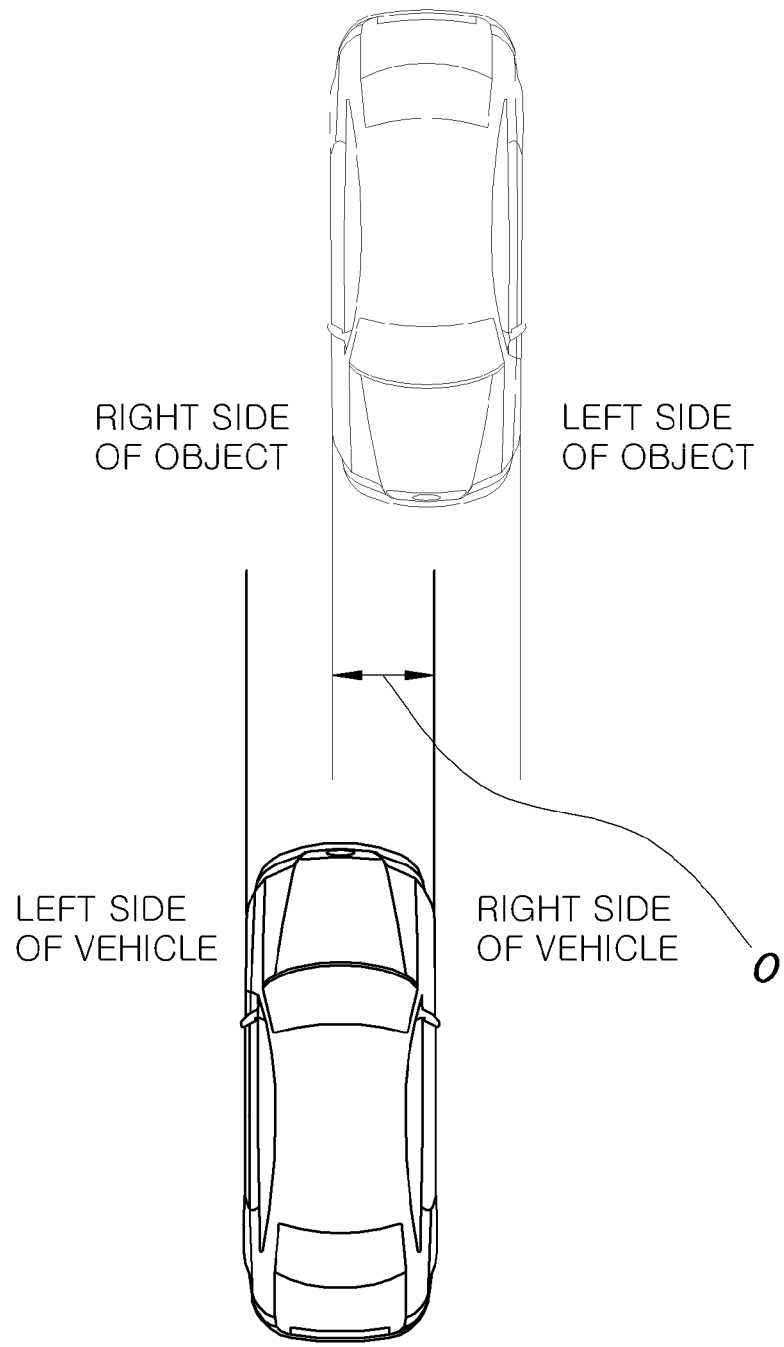
FIG. 5 is a diagram showing an exemplary overlap determination of the external airbag deployment method according to the present invention.

Furthermore, the overlap of the dangerous object with the vehicle is preferably greater than 20% as the second reference. In the case of overlapping, as shown in FIG. 5, a larger one of the left boundary value of a self vehicle and the right boundary value of an object is selected, and a smaller one of the right boundary value of the self vehicle and the left boundary value of the object is selected. Then, values between the selected boundary values are considered to be an overlap distance, and the overlap distance is divided by the width of the self vehicle, and thereafter the divided result value is multiplied by 100 and is represented as a percentage.

Therefore, if an object recognized as the dangerous object has a high relative velocity and a large overlap, the object is promoted to the target object.

Furthermore, the dangerous object can be selected as a target object when a TTE is less than the third reference. The reason for this is that if the dangerous object actually has a high relative velocity, a large overlap, and a short collision time, the dangerous object is an object having a very high risk of collision.

Meanwhile, after the above procedure, the stability determination step S350 of determining whether the vehicle is stable or unstable by comparing the predicted yaw rate of the vehicle with a measured yaw rate is performed.

That is, it is determined whether the driving stability of the self vehicle can be maintained by considering the vehicle to be an object having a two-degree-of-freedom. In brief, if a difference between the actual yaw rate of the vehicle and the predicted yaw rate is greater than a predetermined level, it is determined that the driving stability of the vehicle is broken. This technology is frequently utilized in conventional vehicle posture maintenance technology, that is, Electronic Stability Program (ESP) or the like, and thus a detailed description thereof will be omitted here.

Figure 8:
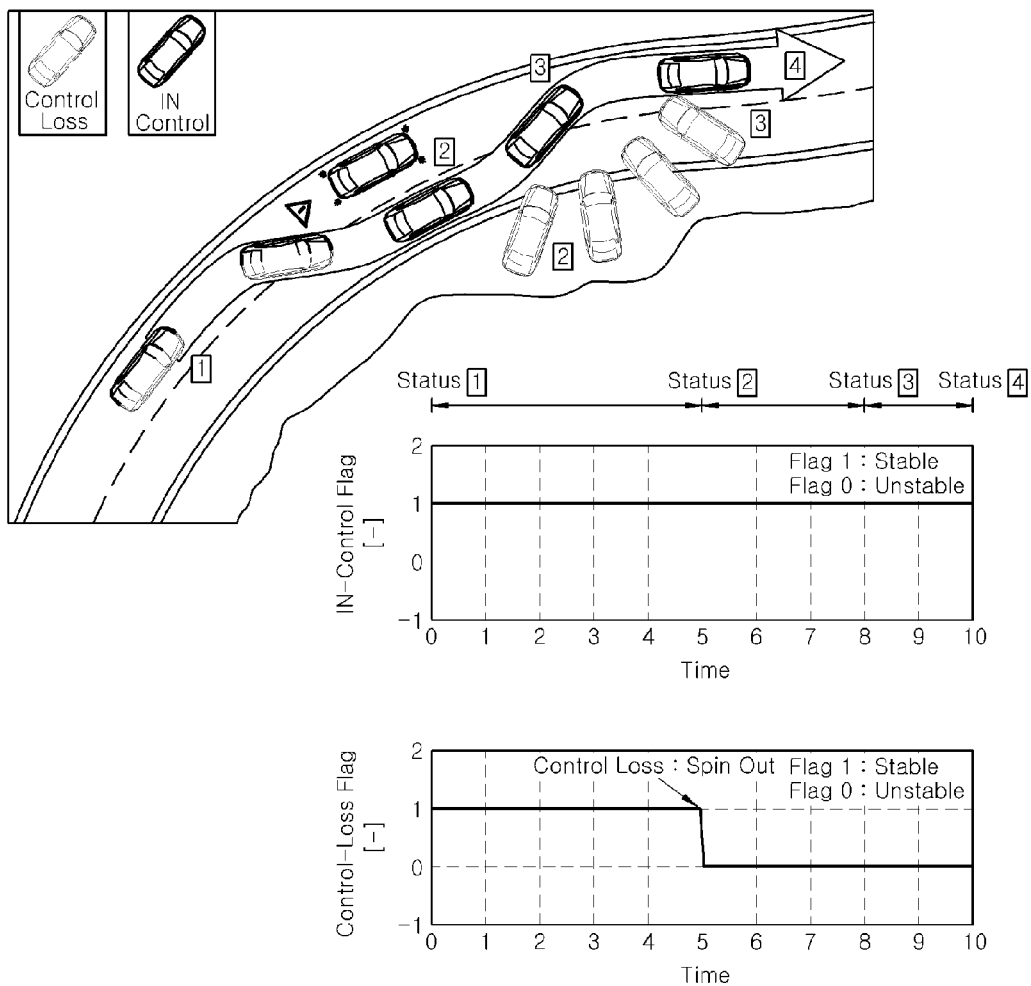
FIG. 8 is a diagram showing an exemplary stability determination step of the external airbag deployment method according to the present invention.

FIG. 8 is a diagram showing the stability determination step of the external airbag deployment method according to various embodiments of the present invention. When the driving of the vehicle is possible in a state in which the vehicle ensures traction stability, this status is designated as flag 1, and the process proceeds to a situation in which the external airbag can be deployed. When traction stability is lost, this status is designated as flag 0, so that the external airbag is not deployed. Therefore, even if the driving of the self vehicle is dangerous, the external airbag is deployed, thus previously blocking a factor that interferes with driving.

Thereafter, the steps S410, S420, S430, and S440 of determining whether a relative velocity and an overlap, predicted when a collision with the vehicle is assumed to occur, are greater than predetermined levels are performed. Further, the predetermined levels at the prediction step and the deployment step may be the first reference in case of the relative velocity and may be the second reference in case of the overlap.

Figure 9:
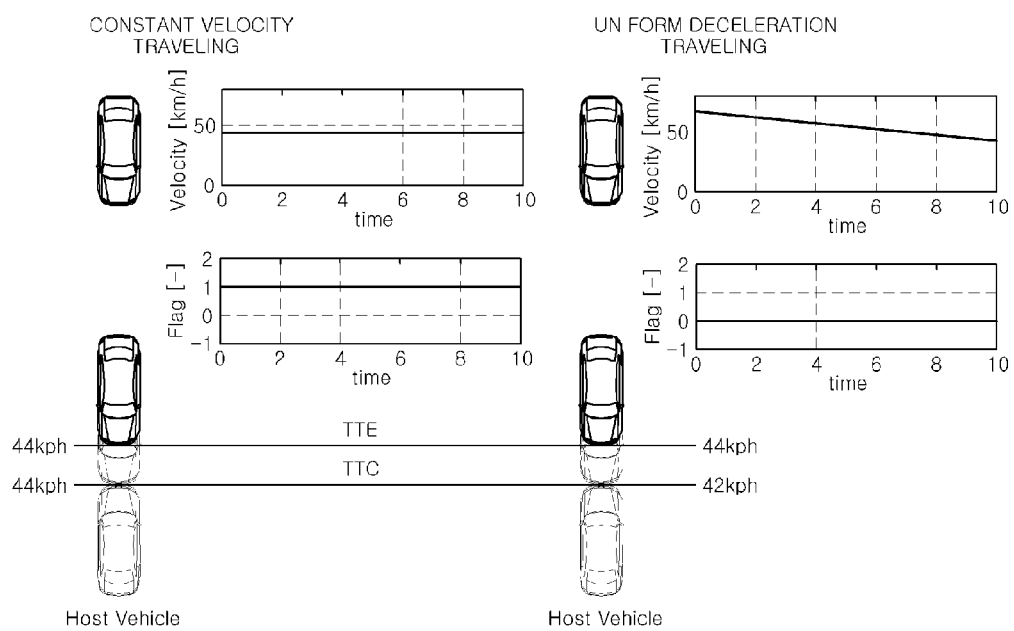
FIG. 9 is a diagram showing an exemplary prediction step of the external airbag deployment method according to the present invention.
Figure 10:
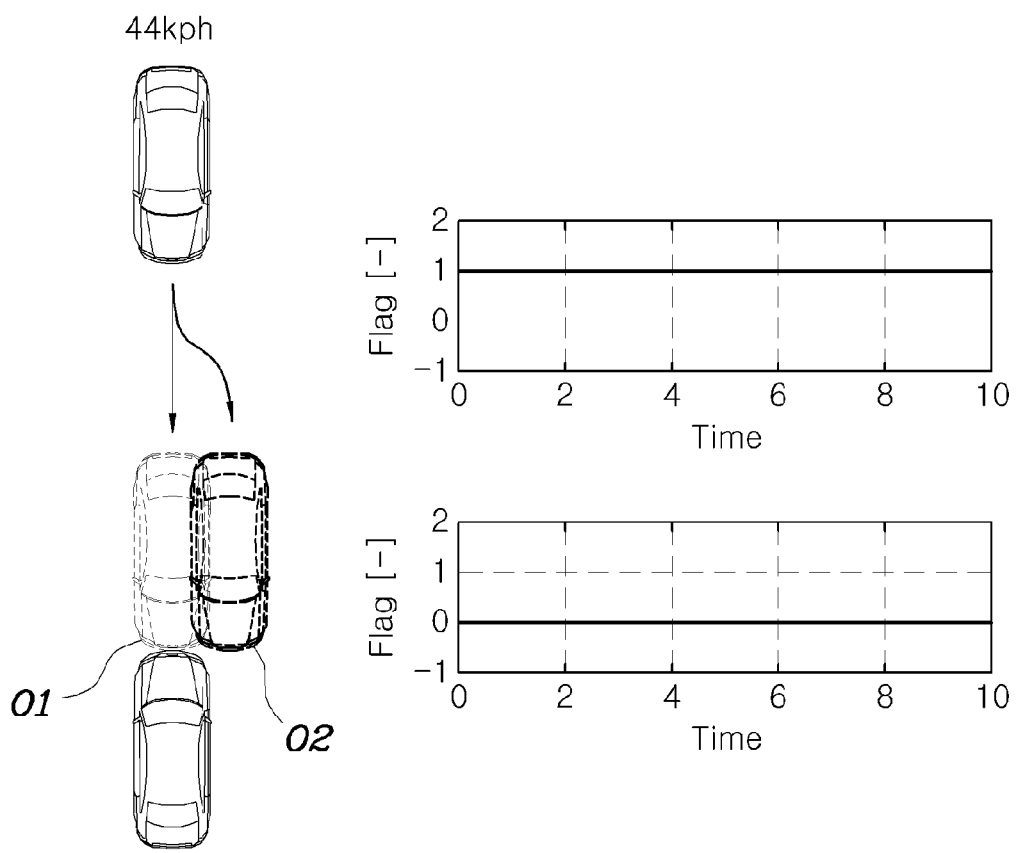
FIG. 10 is a diagram showing an exemplary prediction step of the external airbag deployment method according to the present invention.

FIGS. 9 and 10 are diagrams showing the prediction step of the external airbag deployment method according to various embodiments of the present invention. In FIGS. 9 and 10, when a self vehicle and a target object are traveling at constant velocity, an existing case where the relative velocity is greater than the first reference can be still maintained and satisfied. However, when the self vehicle and the target object are traveling while decelerating, a velocity of e.g., 42 km/h lower than 44 km/h may appear at an actual collision time. Therefore, there is no need to deploy the external airbag in that case.

Therefore, even if the current relative velocity of the target object exceeds a minimum reference value of e.g., 44 km/h, when a predicted value at the collision time does not exceed 44 km/h, the airbag is not deployed. This can be seen by obtaining the mean of pieces of relative velocity data for a predetermined time (TT), dividing the mean by the corresponding predetermined time (TT), obtaining the predicted acceleration of the target object in consideration of the current acceleration of the self vehicle, and tracking the predicted relative velocity of the target object at the moment of TTC based on the predicted acceleration of the target object. In particular, upon predicting the relative velocity, a system delay time is added to the calculated TTC, and thus the relative velocity may be predicted.

In detail, this procedure may be understood by the following Equation (3):

predicted acceleration of target object=(mean of relative velocities for $TT$)/$TT$−current acceleration of self vehicle predicted relative velocity=current relative velocity−(predicted acceleration of target object+current acceleration of self vehicle)×$\Delta T$ $$\Delta T = TTC + \text{system delay error} \tag{3}$$

For reference, the system delay error may be selected from a range between 80 ms and 100 ms depending on system specifications.

Further, even in the case of an overlap, as shown in FIG. 10, an overlap appearing at a time TTC, that is, at the time of collision, is predicted, and whether an actual collision will occur at an overlap of 20% or more is predicted. Similar to this, an overlap can be predicted by obtaining the mean of lateral relative velocities obtained to a current time, and tracking a lateral relative displacement at a time TTC based on the mean. In particular, upon predicting an overlap, a system delay time is added to the calculated TTC, and thus the overlap may be predicted.

In detail, this procedure may be understood by the following Equation (4):

predicted lateral relative velocity=mean of lateral relative velocities for $TT$ predicted overlap=(current overlap+predicted lateral relative velocity×$\Delta T$)/width of self vehicle×100

$$\Delta T = TTC + \text{system delay error} \tag{4}$$

For reference, the system delay error may be selected from a range between 80 ms and 100 ms depending on system specifications.

By means of the predicted relative velocity and the predicted overlap, the present invention prevents false deployment of the external airbag by preventing the external airbag from being deployed when the relative velocity predicted at a TTC, that is, the time of a collision, does not exceed 44 km/h or when the overlap predicted at a TTC does not exceed 20% even if the current relative velocity exceeds 44 km/h and the current overlap exceeds 20%.

Further, if the predicted relative velocity and the predicted overlap of the target object are greater than the predetermined levels, and collision probability (CP) and a variation in CP are greater than predetermined levels, the external airbag can be deployed at steps S510 and S520. That is, the collision probability (CP) can be defined by the following Equation (5):

$$CP = \frac{1}{TTC} \text{ or } CP = \frac{Overlap}{TTC} \quad (5)$$

Therefore, a TTC is obtained by the above procedure, and CP is obtained by taking a reciprocal of TTC or by multiplying the amount of overlap by the reciprocal of TTC. The actual CP is considered to be very high when the obtained CP exceeds a predetermined value, so that the airbag is deployed, thus preventing the false deployment of the airbag.

Further, the collision probability is calculated at intervals of e.g., 1 ms, so that if the slope of the rate of a variation in CP is less than a predetermined slope, the airbag is not deployed, and thus the false deployment of the airbag is prevented.

Figure 11:
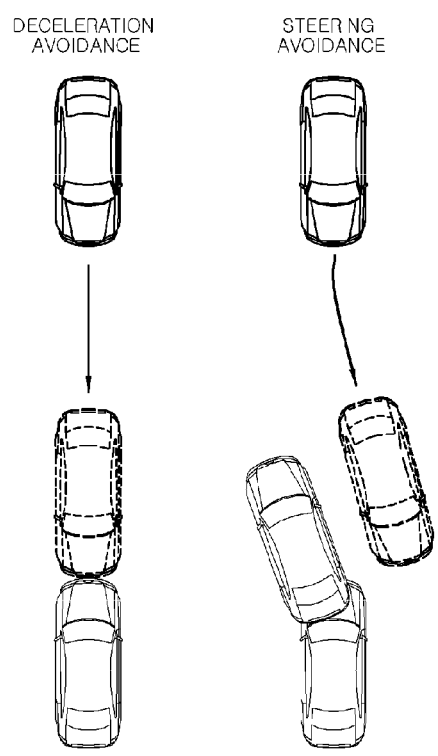
FIG. 11 is a diagram showing an exemplary avoidance step of the external airbag deployment method according to the present invention.
Figure 11:
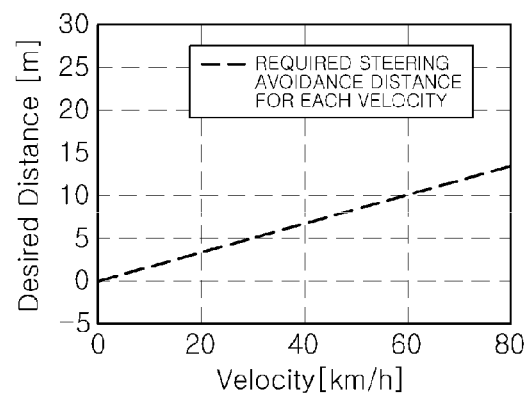
Figure 11:
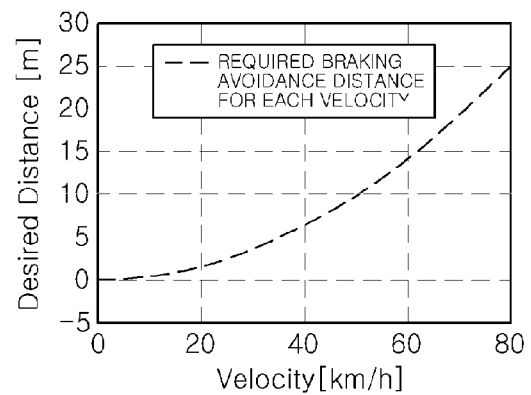
Figure 12:
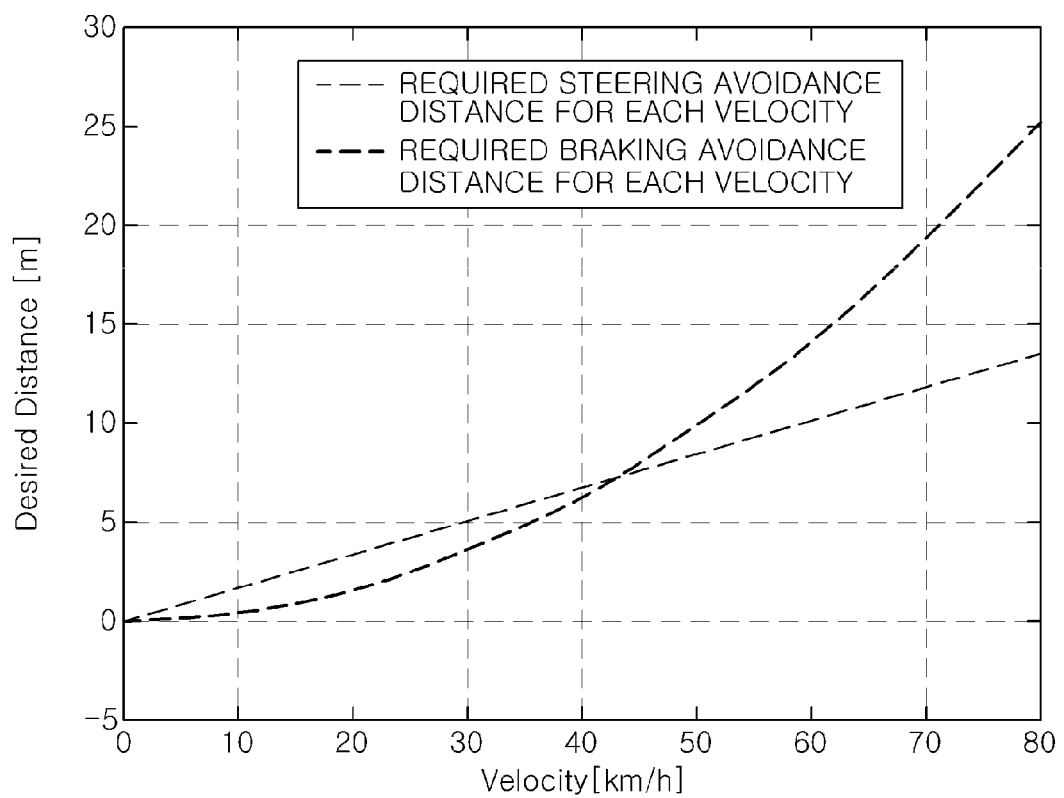
FIG. 12 is a diagram showing an exemplary avoidance step of the external airbag deployment method according to the present invention.
Figure 13:
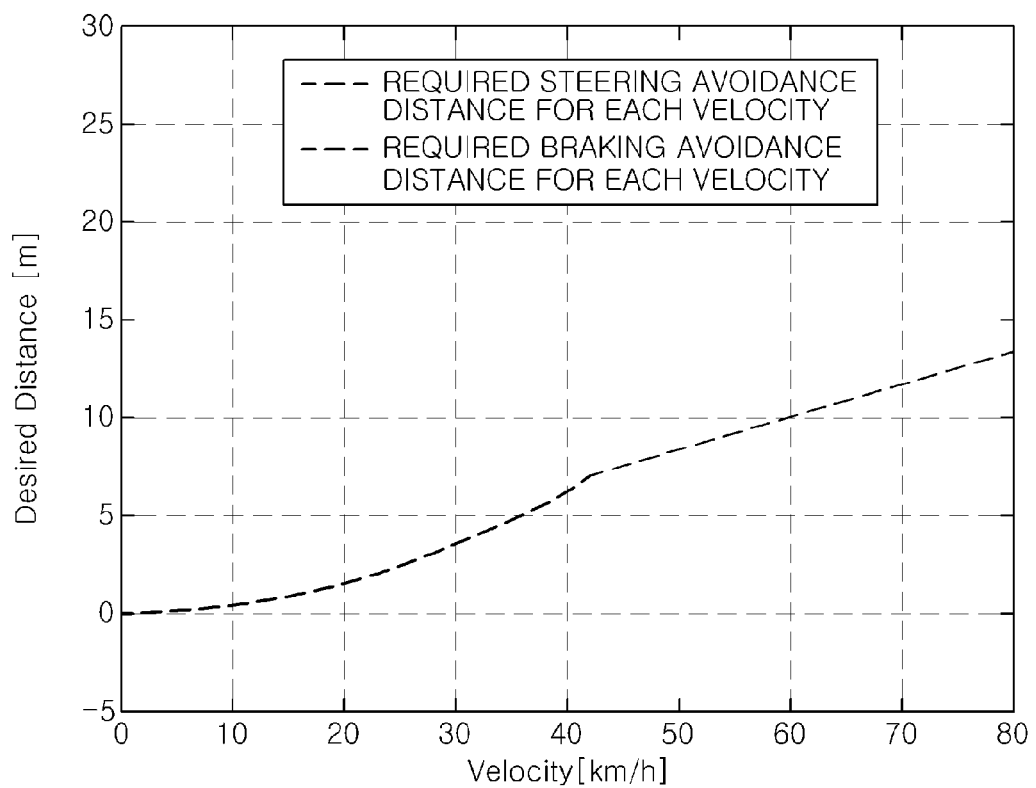
FIG. 13 is a diagram showing an exemplary avoidance step of the external airbag deployment method according to the present invention.

Meanwhile, when a distance between the vehicle and the target object is less than a required steering avoidance distance and a required braking avoidance distance, the external airbag can be deployed (that is, Point Of No Return: PONR is calculated) at step S530 and S540. FIGS. 11 and 13 are diagrams showing the avoidance step of the external airbag deployment method according to various embodiments of the present invention. In the drawings, a vehicle can urgently avoid a collision using deceleration or steering, and this can be basically represented by a relationship between a relative velocity and a relative distance.

Therefore, respective graphs for a required steering avoidance distance and a required braking avoidance distance versus a relative velocity overlap each other. A portion under a common denominator of the graphs, that is, the curve of the graph of FIG. 13, indicates that even if braking or steering is sufficiently conducted, a collision cannot be avoided. Therefore, only in this case, the airbag is deployed, thus carefully preventing the false operation of the airbag.

The required braking avoidance distance can be given by the following Equation (6):

$$d_{braking} = \frac{v_0^2 - v^2}{2a_x} (v = 0, \ a_x = 1.0g) \quad (6)$$

This distance denotes a function of dividing a square of the relative velocity by twice the acceleration of gravity g.

Further, the required steering avoidance distance can be given by the following Equation (7):

$$d_{steering} = \sqrt{\frac{2 \cdot o_i}{a_y}} \cdot v_{rel} \quad (7)$$

$o_i$ = current overlap amount $\sqrt{\frac{2 \cdot o_i}{a_y}}$ = time required to avoid current overlap amount ($o_i$) using $a_y$(1.0g)

This Equation can obtain the required steering avoidance distance by dividing twice the current overlap amount by a lateral relative velocity, taking a square root of the divided result value, and multiplying the lateral relative velocity by the square root.

Meanwhile, after this procedure has been performed, the validation step S560 of validating the presence of the target object using an ultrasonic sensor is finally performed, so that the errors of the sensor are prevented. Then, the step S570 of checking whether communication and parts are normal is performed, and then the step S580 of deploying the external airbag is performed.

The external airbag deployment method according to the present invention will be summarized again below. First, a detection area is set in consideration of the deployment characteristics of an external airbag, thus greatly reducing the burden of data processing by monitoring only pieces of data about actual objects.

Further, data is predicted and calculated during each measurement period of a sensor, so that the generation of data is possible at intervals of e.g., 1 ms, thus stably coping with even a high-speed driving situation.

After dangerous objects have been first selected based on a TTC and a TTE, a corresponding dangerous object is promoted to a target object in consideration of a relative velocity, an overlap, and a TTE, thus specifying and continuously tracking the object in conformity with the actual collision situation of the vehicle.

Furthermore, the present invention is characterized in that even if an object is promoted to a target object, the target object is filtered in consideration of a relative velocity and an overlap at a time TTC, thus preventing false deployment, and in that the target object is also filtered in consideration of collision probability (CP), a variation in CP, vehicle stability, a required steering avoidance distance, and a required braking avoidance distance, thus greatly decreasing a concern about a false operation.

In accordance with the external airbag deployment method having the above-described configuration, the present invention determines all of the traction stability of a self vehicle, and a physical quantity, a collision probability, and collision avoidance possibility upon predicting a collision with another vehicle even if the deployment of the external airbag has been determined to some degree, and then finally deploys the external airbag, thus remarkably reducing the possibility of malfunctioning that may be a problem in the characteristics of the external airbag, with the result that the reliability of the system can be improved.

Further, the present invention can present a precise control method capable of preventing false deployment and obtaining effective deployment by exactly determining collisions. Furthermore, even if the measurement performance of a sensor is insufficient, a data management method capable of supporting such measurement performance and then enabling maximally effective determination is presented.

Finally, the present invention can present logic for definitely preventing false deployment by re-checking the validity of the need for deployment.

For convenience in explanation and accurate definition in the appended claims, the terms "left" or "right", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An external airbag deployment method, comprising:
a) setting a detection area located in front of a vehicle;
b) selecting a target object from among objects detected in the detection area by comparing relative velocities, overlaps, and Time To External Airbag (TTE) values of the detected objects, wherein the TTE is a remaining time until a collision with an airbag cushion occurs when an external airbag is assumed to be deployed;
c) determining whether the vehicle is stable or unstable by comparing a predicted yaw rate of the vehicle with a measured yaw rate;
d) determining whether a relative velocity and an overlap of the target object, predicted at a time when the target object is assumed to collide with the vehicle, are greater than predetermined levels, wherein the relative velocity and the overlap are predicted in consideration of a system delay time;

wherein the d) predicts the relative velocity using the equations:

a predicted acceleration of the target object=(mean of relative velocities for $TT$)/the $TT$-current acceleration of self vehicle,   1)

a predicted relative velocity=a current relative velocity−(the predicted acceleration of the target object+a current acceleration of the self vehicle)×$\Delta T$, and   2)

the $\Delta T = TTC$+system delay error,   3)

wherein the TT denotes a predetermined time, and the TTC denotes a Time To Collision, wherein d) predicts the overlap using a following equations:

a predicted lateral relative velocity=mean of lateral relative velocities for the $TT$,   1)

a predicted overlap=(a current overlap+the predicted lateral relative velocity×the $\Delta T$)/width of the self vehicle×100, and   2)

the $\Delta T$=the $TTC$+the system delay error,   3)

wherein
the d) further comprises determining whether a collision probability based on a reciprocal of the TTC and a variation in collision probability is greater than predetermined levels; and
e) deploying the external airbag if it is determined that the vehicle is stable and the predicted relative velocity and the overlap of the target object are greater than the predetermined levels, and the collision probability and the variation in the collision probability are greater than the predetermined levels.

2. The external airbag deployment method of claim 1, wherein the b) is configured to select a detected object as the target object if the relative velocity of the detected object is greater than a first reference, the overlap of the detected object is greater than a second reference, and the TTE of the detected object is less than a third reference.

3. The external airbag deployment method of claim 2, wherein the predetermined levels at the d) and the e) are the first reference in case of the relative velocity and the second reference in case of the overlap, respectively.

4. The external airbag deployment method of claim 3, wherein the first reference is selected from a range between 40 km/h and 50 km/h.

5. The external airbag deployment method of claim 3, wherein the second reference is selected from a range between 10% and 30%.

6. The external airbag deployment method of claim 3, wherein the third reference is selected from a range between 70 ms and 90 ms.

* * * * *